United States Patent
Yue

(10) Patent No.: US 8,011,819 B2
(45) Date of Patent: Sep. 6, 2011

(54) LIGHT GUIDE PLATE AND METHOD FOR MANUFACTURING THE SAME, AND BACKLIGHT MODULE USING THE SAME

(75) Inventor: Guo-Han Yue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 271 days.

(21) Appl. No.: 12/317,991

(22) Filed: Dec. 31, 2008

(65) Prior Publication Data

US 2010/0014316 A1    Jan. 21, 2010

(30) Foreign Application Priority Data

Jul. 21, 2008   (CN) .......................... 2008 1 0302865

(51) Int. Cl.
*F21V 7/04* (2006.01)
*G02F 1/1335* (2006.01)

(52) U.S. Cl. ........................ 362/615; 362/626; 362/97.1
(58) Field of Classification Search ................... 362/615, 362/617, 619, 620, 623, 625, 626, 97.1–97.4
See application file for complete search history.

(56) References Cited

U.S. PATENT DOCUMENTS

| | | | | |
|---|---|---|---|---|
| 5,363,294 A | * | 11/1994 | Yamamoto et al. | 362/330 |
| 7,081,933 B2 | * | 7/2006 | Yu et al. | 349/62 |
| 2005/0270802 A1 | * | 12/2005 | Hsu et al. | 362/626 |

* cited by examiner

*Primary Examiner* — Bao Q Truong
(74) *Attorney, Agent, or Firm* — Altis Law Group, Inc.

(57) ABSTRACT

A light guide plate includes a light input surface, a light output surface adjoining the light input surface, and a reflecting surface opposite the light output surface. One of the light output surface and the reflecting surface defines a plurality of scattering microstructures. Each scattering microstructure includes a spherical protrusion having a substantially spherical surface, and a substantially ring-shaped groove defined around a periphery of the spherical protrusion. At least half of the spherical surface is as smooth as a mirror. A method for manufacturing the light guide plate and a backlight module using the light guide plate are also provided.

9 Claims, 5 Drawing Sheets

LIGHT GUIDE PLATE AND METHOD FOR MANUFACTURING THE SAME, AND BACKLIGHT MODULE USING THE SAME

BACKGROUND

1. Technical Field

The present disclosure relates to a light guide plate for use in a backlight module.

2. Description of Related Art

In a typical liquid crystal display device, a liquid crystal panel of the typical liquid crystal display device relies on a backlight module powered by electricity to supply the light needed to display images and data.

Currently, backlight modules can be classified as either an edge lighting type or a bottom lighting type depending upon the location of lamps within the device. A typical edge lighting type backlight module includes a light source and a light guide plate. The light guide plate includes a light input surface located at a side surface thereof, a light output surface adjoining the light input surface, and a reflecting surface positioned opposite the light output surface. The light source is generally positioned at the light input surface of the light guide plate. The light guide plate may have a plurality of scattering microstructures positioned on the reflecting surface. The plurality of scattering microstructures can sufficiently scatter light, thereby to improve the optical uniformity of the backlight module.

However, the plurality of scattering microstructures is generally printed or chemically etched on the reflecting surface. As a result, each of the scattering microstructures has a large size because of a low machining precision of the printing or chemical etching, and each of the scattering microstructures is generally brighter than an area around the scattering microstructure. Thus, light spots of the scattering microstructures often occur.

In order to reduce or eliminate the light spot of the scattering microstructure, the backlight module further includes a light diffusion film positioned on top of the light guide plate, and prism sheets positioned on top of the light diffusion film. Light emitted out from the light guide plate is scattered by the light diffusion film, condensed by the prism sheets, and emitted out from the backlight module. However, an air gap exists at the boundary between the light diffusion film and the light guide plate. When the backlight module is in use, light passes through the air gap, and some of the light undergoes total reflection at one or both of the corresponding boundaries. In addition, the light diffusion film may absorb some of the light emitted out from the light guide plate. As a result, the brightness of the backlight module is decreased.

What is needed, therefore, is a new light guide plate and a backlight module that overcomes the above mentioned disadvantages.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
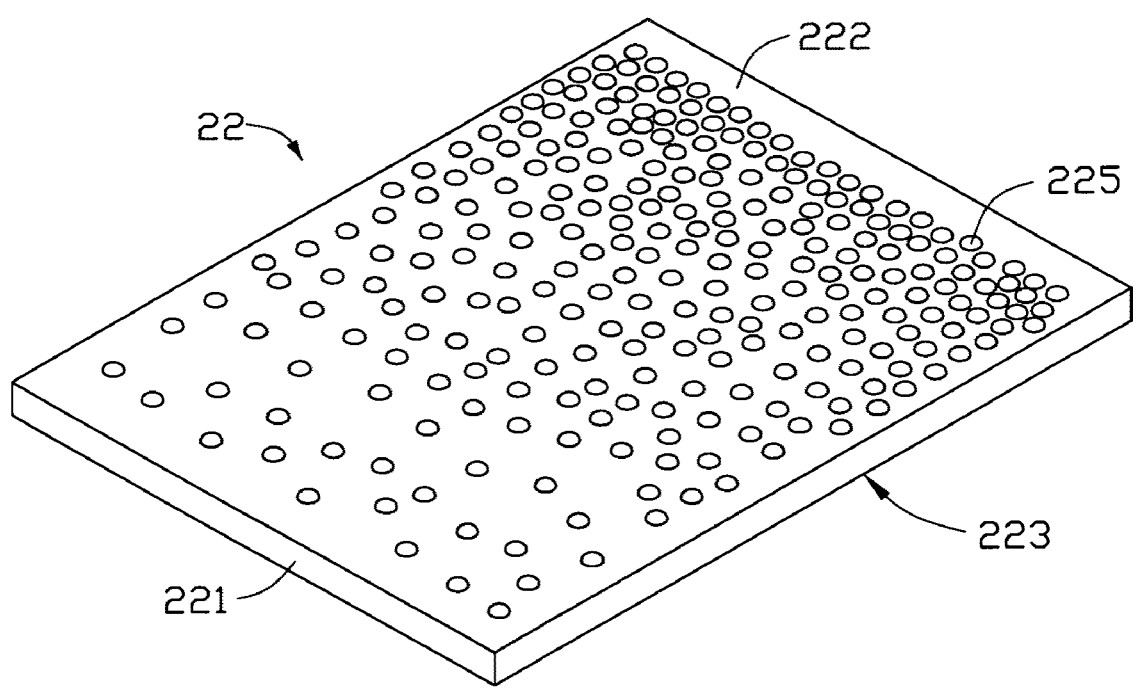
FIG. 1 is an isometric view of an embodiment of a light guide plate.

Referring to FIG. 1, an embodiment of a light guide plate 22 is a transparent plate, and includes a light input surface 221 located at a side surface of the light guide plate 22, a light output surface 222 adjoining the light input surface 221, and a reflecting surface 223 opposite the light output surface 222. The light guide plate 22 includes a plurality of scattering microstructures 225 irregularly distributed on the light output surface 222. A density of the plurality of scattering microstructures 225 increases with increasing distance from the light input surface 221.

Figure 2:
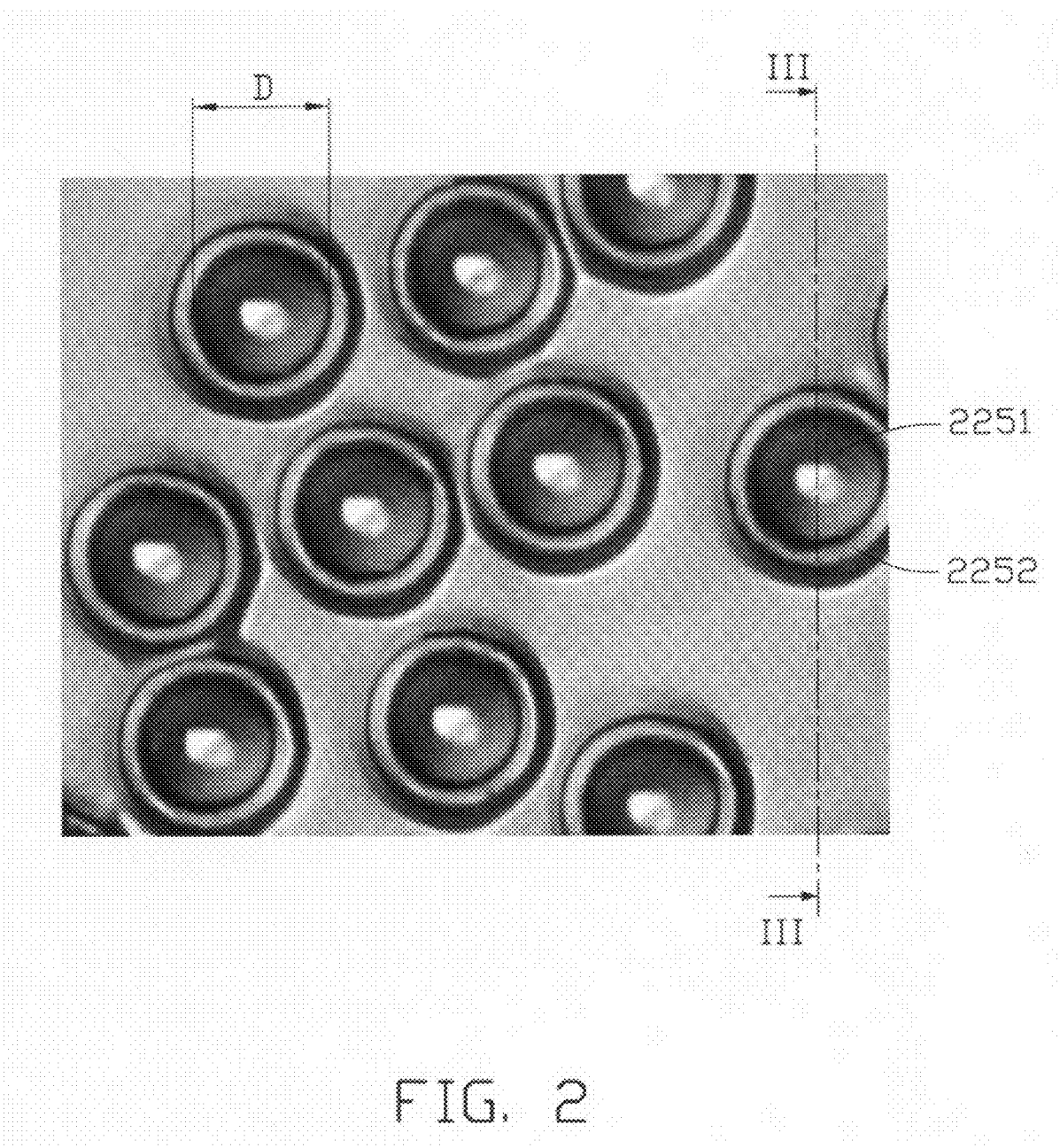
FIG. 2 is an electron micrograph of a portion of the light guide plate in FIG. 1.
Figure 3:
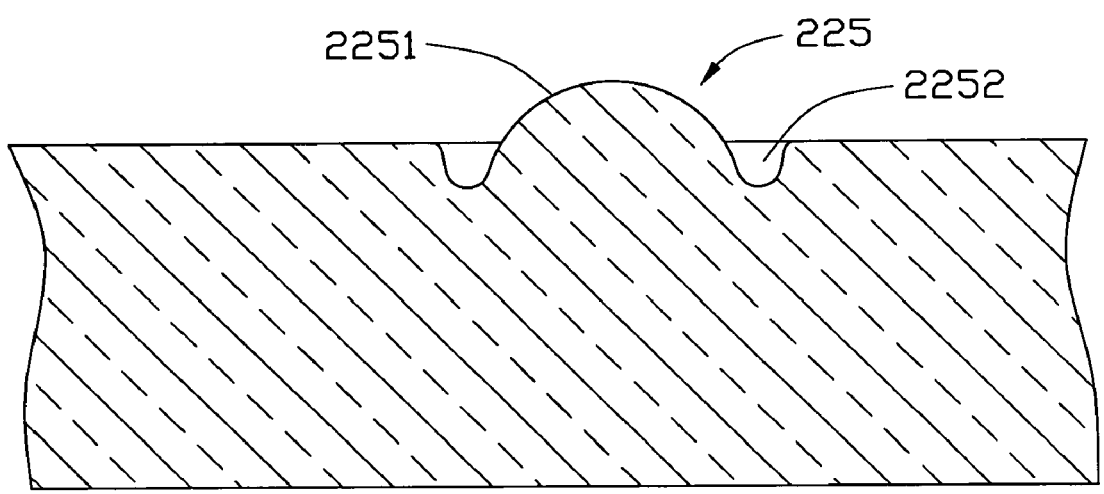
FIG. 3 is a partial, cross-sectional view of the light guide plate taken along line III-III in FIG. 2.

Referring to FIGS. 2 and 3, each scattering microstructure 225 includes a spherical protrusion 2251 having a substantially spherical surface, and a substantially ring-shaped groove 2252 defined around a periphery of the spherical protrusion 2251. At least half of the spherical surface is as smooth as a mirror. In the illustrated embodiment, at least 90% of the substantially spherical surface is as smooth as a mirror. A maximum width D of each spherical protrusion 2251 is less than or equal to 0.06 millimeters. In one embodiment, the plurality of scattering microstructures 225 may be formed on the reflecting surface 223, or formed on both of the light output surface 222 and the reflecting surface 223. In another embodiment, the spherical protrusion 2251 of the scattering microstructure 225 may be substituted by other various, suitable protrusions, such as conical protrusions or frustum protrusions.

An embodiment of a method for manufacturing the light guide plate 22 includes the following steps. Depending on the embodiment, certain of the steps described below may be removed, others may be added, and the sequence of steps may be altered.

Figure 4:
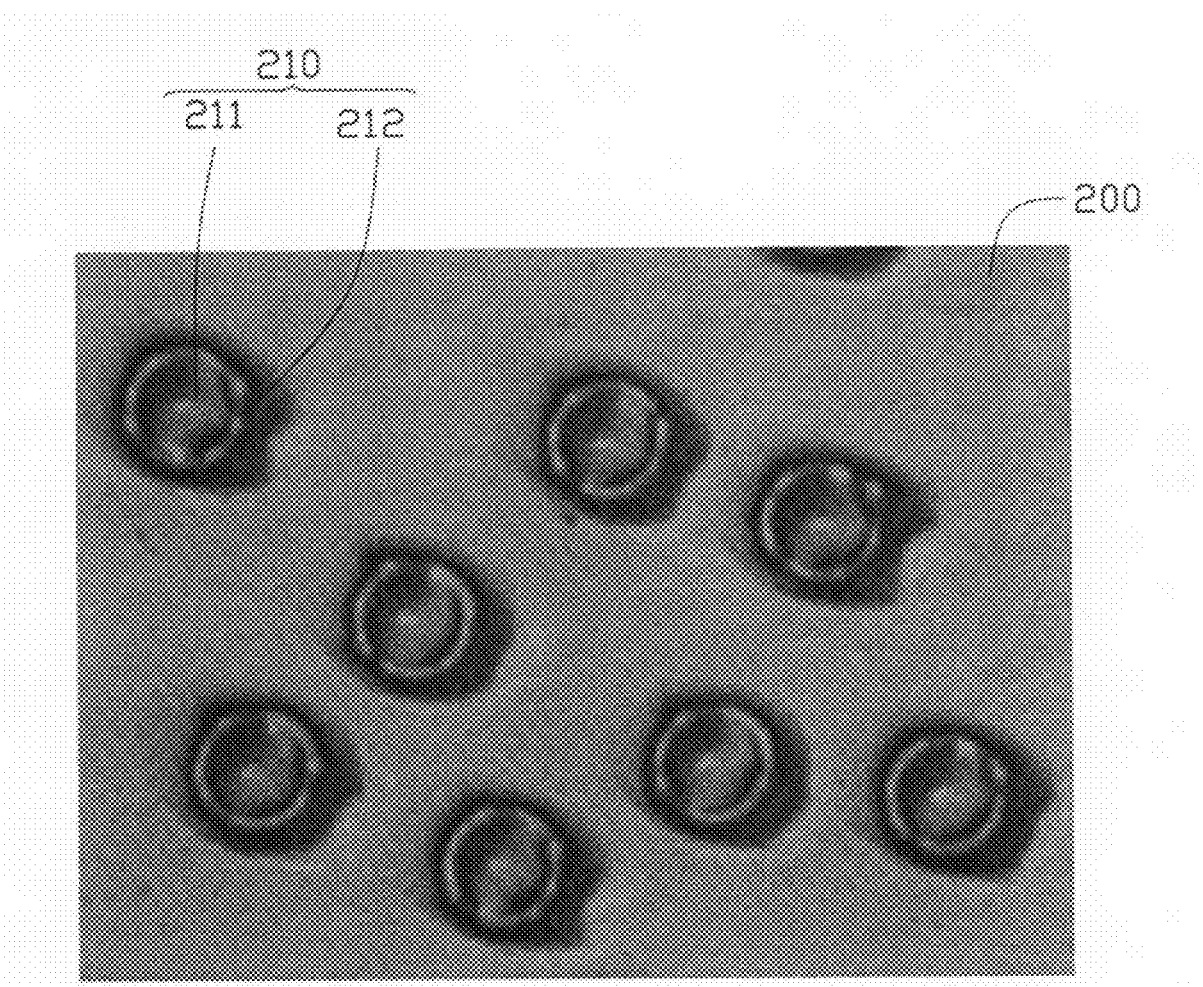
FIG. 4 is an electron micrograph of a portion of a cavity plate for manufacturing the light guide plate in FIG. 3.

First, an injection mold (not shown) including a cavity plate 200 (shown in FIG. 4) is provided.

Next, a plurality of microstructures 210 is formed on the cavity plate 200 by laser etching. Each microstructure 210 defines a substantially spherical recess 211 having a concave surface, and a substantially ring-shaped protrusion 212 formed around a periphery of the spherical recess 211. At least half of the concave surface is as smooth as a mirror. In the illustrated embodiment, laser etching is emitted via an neodymium-doped yttrium aluminum garnet laser (Nd-YAG). The wavelength of the laser is in a range from about 1000 nanometers to about 1500 nanometers, and preferably, about 1064 nanometers. The laser is focused on the cavity plate 200, rapidly increasing a temperature of the focus point. As a result, the cavity plate 200 material at the focus point disintegrates due to high temperature oxidation, thus forming the spherical recess 211. Simultaneously, the cavity plate 200 material around the focus point is melted, forming the ring-shaped protrusion 212.

Finally, the light guide plate 22 is molded in the injection mold. The spherical protrusions 2251 are formed on the light guide plate 22 corresponding to the spherical recesses 211 of the cavity plate 200, and the ring-shaped grooves 2252 are defined in the light guide plate 22 corresponding to the ring-shaped protrusions 212 of the cavity plate 200.

The light guide plate 22 may be made from a material such as polycarbonate, polymethyl methacrylate, polystyrene, copolymer of methylmethacrylate and styrene, and any suitable combination thereof. In alternative embodiments, laser etching may be emitted via ruby laser, alexandrite laser, and so on. The wavelength of the laser may also be selected from other desired values, such as 266 nanometers, 355 nanometers, 532 nanometers, and so on. The smaller the wavelength of the laser, the less the maximum width of each scattering microstructure 225.

When the light guide plate 22 is used in a backlight module, light is projected from a light source to the light input surface 221 of the light guide plate 22. When the light travels to the scattering microstructure 225, some of the light is reflected and refracted by the ring-shaped groove 2252, thereby preventing the light from escaping directly out of the light guide plate 22. The light becomes adjusted by the ring-shaped groove 2252, and travels to the spherical protrusions 2251. Some of the adjusted light is refracted at the spherical surface, and travels out from the spherical surface. Some of the adjusted light is reflected at the spherical surface. Because most of the spherical surface is as smooth as a mirror, some of the reflected adjusted light is not reflected as diffused light, but reflected directly into the light guide plate 22 along a predetermined direction. Then some of the reflected adjusted light is reflected via the reflecting surface 223, and finally travels out from an area around the scattering microstructure 225, thereby increasing a brightness of the area around the scattering microstructure 225. In addition, the plurality of scattering microstructures 225 have a very small size due to a high machining precision of the laser etching, thus light spots of the scattering microstructures 125 are reduced or eliminated. Thus, the backlight module using the light guide plate 22 has a high optical uniformity.

Moreover, the plurality of scattering microstructures 225 are irregularly positioned on the light output surface 222, thus decreasing occurrences of interference lines on the light output surface 222 adjacent the light source. Since the density of the plurality of scattering microstructures 225 increases with increasing distance from the light input surface 221, a brightness of an area on the light output surface 222 away from the light input surface 221 is improved, further improving the optical uniformity of the backlight module.

Figure 5:
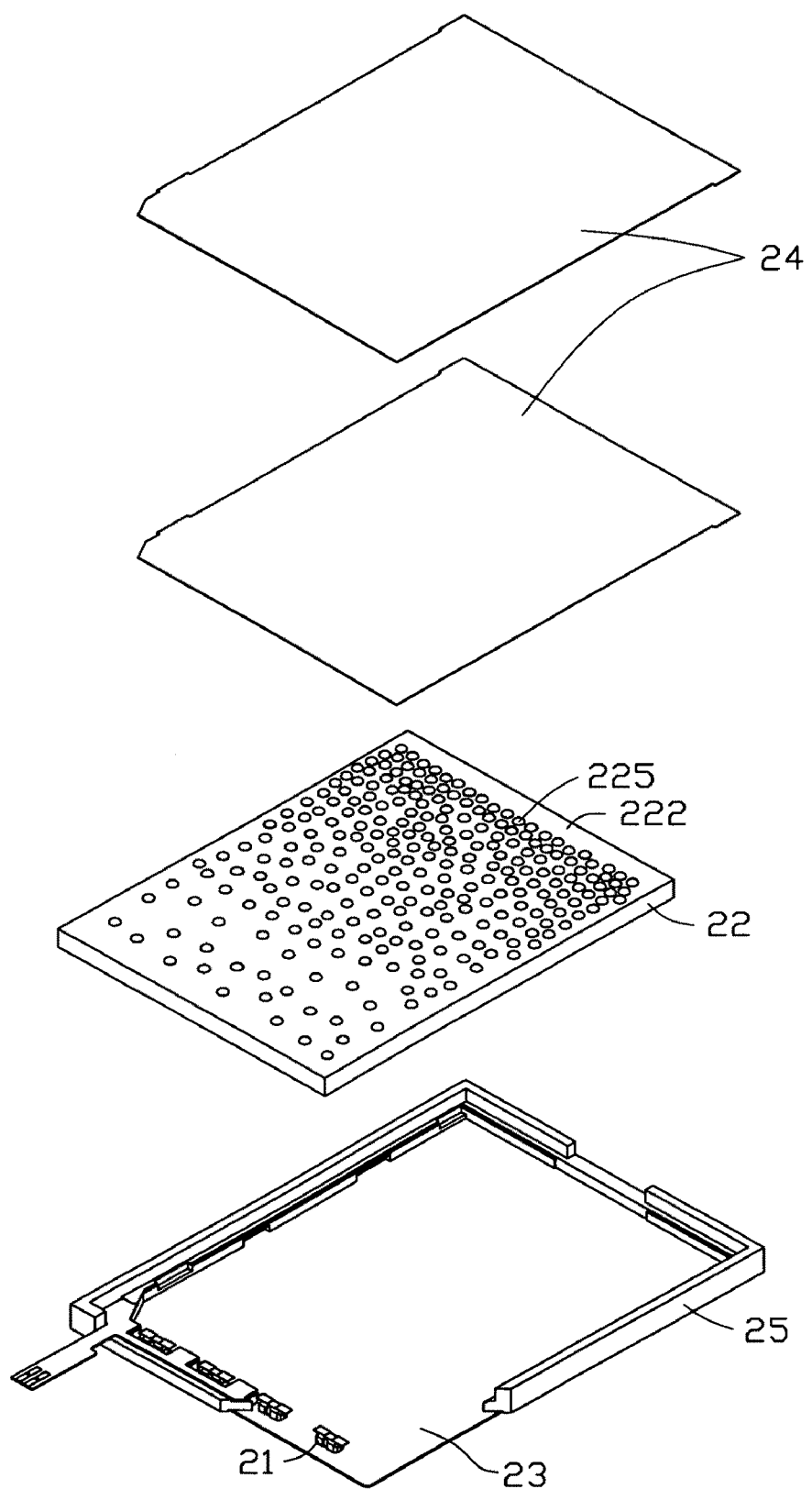
FIG. 5 is an exploded, isometric view of an embodiment of a backlight module adopting the light guide plate in FIG. 1.

Referring to FIG. 5, an embodiment of a backlight module 20 includes a light source 21, the light guide plate 22, a reflecting sheet 23 positioned below the light guide plate 22, a prism sheet 24 positioned on top of the light guide plate 22, and a frame 25 for positioning the above components. The light source 21 is positioned adjacent to the light input surface 221 of the light guide plate 22. In the illustrated embodiment, the light source 21 may be a cold cathode fluorescent lamp. In another embodiment, the light source 21 may be a plurality of light emitting diodes arranged in a straight line. The reflecting sheet 23 can reflect light emitted out from the light guide plate 22 back to the light guide plate 22, thus improving a light energy utilization rate. The prism sheet 24 can condense light to emit out at a relatively small light emitting angle, thus increasing optical brightness of the backlight module.

Since light emitted out from the light guide plate 22 is uniform and does not need to be diffused, a light diffusion film can be omitted in the backlight module 20. The light emitted out from the light guide plate 22 travels to the prism sheet 24 directly, and does not undergo total reflection or absorption of the light diffusion film, so that the light energy utilization rate is increased significantly. In the illustrated embodiment, the light energy utilization rate increased by about 30%. In addition, the light emitting out from the light guide plate 22 travels to the prism sheet 24 directly, without being diffused by the light diffusion film. Thus, the light emitting angle is small to promote the light condense effect of the prism sheet 24. Moreover, because the light diffusion film is omitted, the backlight module 20 has a low cost and a thin thickness.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A light guide plate comprising:
   a light input surface;
   a light output surface adjoining the light input surface; and
   a reflecting surface opposite the light output surface;
   wherein at least one of the light output surface and the reflecting surface defines a plurality of scattering microstructures, each scattering microstructure comprises a protrusion having an outer surface, and a groove defined around a periphery of the protrusion, at least half of the outer surface is a mirror-like surface;
   wherein the protrusion of the scattering microstructure is substantially spherical, and the groove of the scattering microstructure is substantially ring-shaped.

2. The light guide plate of claim 1, wherein at least 90% of the outer surface of the scattering microstructure is a mirror-like surface.

3. The light guide plate of claim 1, wherein the plurality of scattering microstructures is irregularly distributed on the at least one of the light output surface and the reflecting surface.

4. The light guide plate of claim 1, wherein a density of the plurality of scattering microstructures increases with increasing distance from the light input surface of the light guide plate.

5. The light guide plate of claim 1, wherein a maximum width of the spherical protrusion of the scattering microstructure is less than or equal to 0.06 millimeters.

6. A backlight module comprising:
   a light source; and
   a light guide plate comprising
      a light input surface, the light source positioned adjacent to the light input surface;
      a light output surface adjoining the light input surface, and
      a reflecting surface opposite the light output surface;
   wherein at least one of the light output surface and the reflecting surface defines a plurality of scattering microstructures, each scattering microstructure comprising a protrusion having an outer surface, and a groove defined around a periphery of the protrusion, at least half of the outer surface is a mirror-like surface;
   wherein the protrusion of the scattering microstructure is substantially spherical, and the groove of the scattering microstructure is substantially ring-shaped.

7. The backlight module of claim 6, wherein the light source is a cold cathode fluorescent lamp, or a plurality of light emitting diodes.

8. The backlight module of claim 6, further comprising a reflecting sheet positioned below the light guide plate for reflecting light emitted out from the light guide plate back to the light guide plate.

9. The backlight module of claim 6, further comprising a prism sheet positioned on top of the light guide plate for condensing light to emit out at a small light emitting angle.

* * * * *